(12) United States Patent　　　(10) Patent No.: US 7,137,307 B2
Huybrechts et al.　　　(45) Date of Patent: Nov. 21, 2006

(54) MAGNETIC-INDUCTIVE MEASURING DEVICE FOR FLOWING SUBSTANCES AND METHOD FOR ITS PRODUCTION

(75) Inventors: Dirk Huybrechts, Heidelberg (DE); Hans-Werner Schwiderski, Norten-Hardenberg (DE); Gunter Rasche, Borgentreich (DE); Arno Erich Oehler, Rosdorf (DE); Dieter Keese, Wahlsburg (DE); Dominik Eifel, Schwetzingen (DE); Eniet Asaah, Mannheim (DE); Andreas Thone, Northeim (DE); Ralf Huck, Hanau (DE); Wolfgang Scholz, Minden (DE); Fabrizio Lorito, Mailand (DE); Albrecht Vogel, Stutensee (DE); Paul Szasz, Plankstadt (DE)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 10/958,372

(22) Filed: Oct. 6, 2004

(65) Prior Publication Data
US 2005/0183514 A1　Aug. 25, 2005

(30) Foreign Application Priority Data
Oct. 10, 2003　(DE)　................................ 103 47 890

(51) Int. Cl.
*G01F 1/58*　(2006.01)
(52) U.S. Cl. .................................................. 73/861.12

(58) Field of Classification Search ............. 73/861.12, 73/861.14
See application file for complete search history.

(56) References Cited

U.S. PATENT DOCUMENTS

| 3,005,342 | A | * | 10/1961 | Head | 73/861.16 |
| 3,108,474 | A | * | 10/1963 | Sasaki et al. | 73/861.12 |
| 3,274,831 | A | * | 9/1966 | Cushing | 73/861.14 |
| 3,406,569 | A | | 10/1968 | Rohmann | |
| 3,479,871 | A | | 11/1969 | Cushing | |
| 3,745,824 | A | | 7/1973 | Mannherz et al. | |
| 3,924,466 | A | | 12/1975 | Medlar | |

FOREIGN PATENT DOCUMENTS

| DE | 33 29 689 A1 | 3/1984 |
| DE | 0 116 875 A1 | 8/1984 |
| DE | 197 08 857 A1 | 7/1998 |

* cited by examiner

*Primary Examiner*—Harshad Patel
(74) *Attorney, Agent, or Firm*—Buchanan Ingersoll & Rooney PC

(57) ABSTRACT

The invention relates to a magnetic-inductive measuring device for flowing substances with at least one subsystem respectively for carrying the substances, recording measuring signals through a signal pickup, generating a magnetic field through at least two exciting coils and a ferromagnetic core and bounding the measuring device on the ambient side of the housing. The measuring device is characterized in that at least one of the subsystems is entirely or partly formed by layers of fibre composite material and/or is embedded in layers of fibre composite material.

13 Claims, 13 Drawing Sheets

Figure 1:
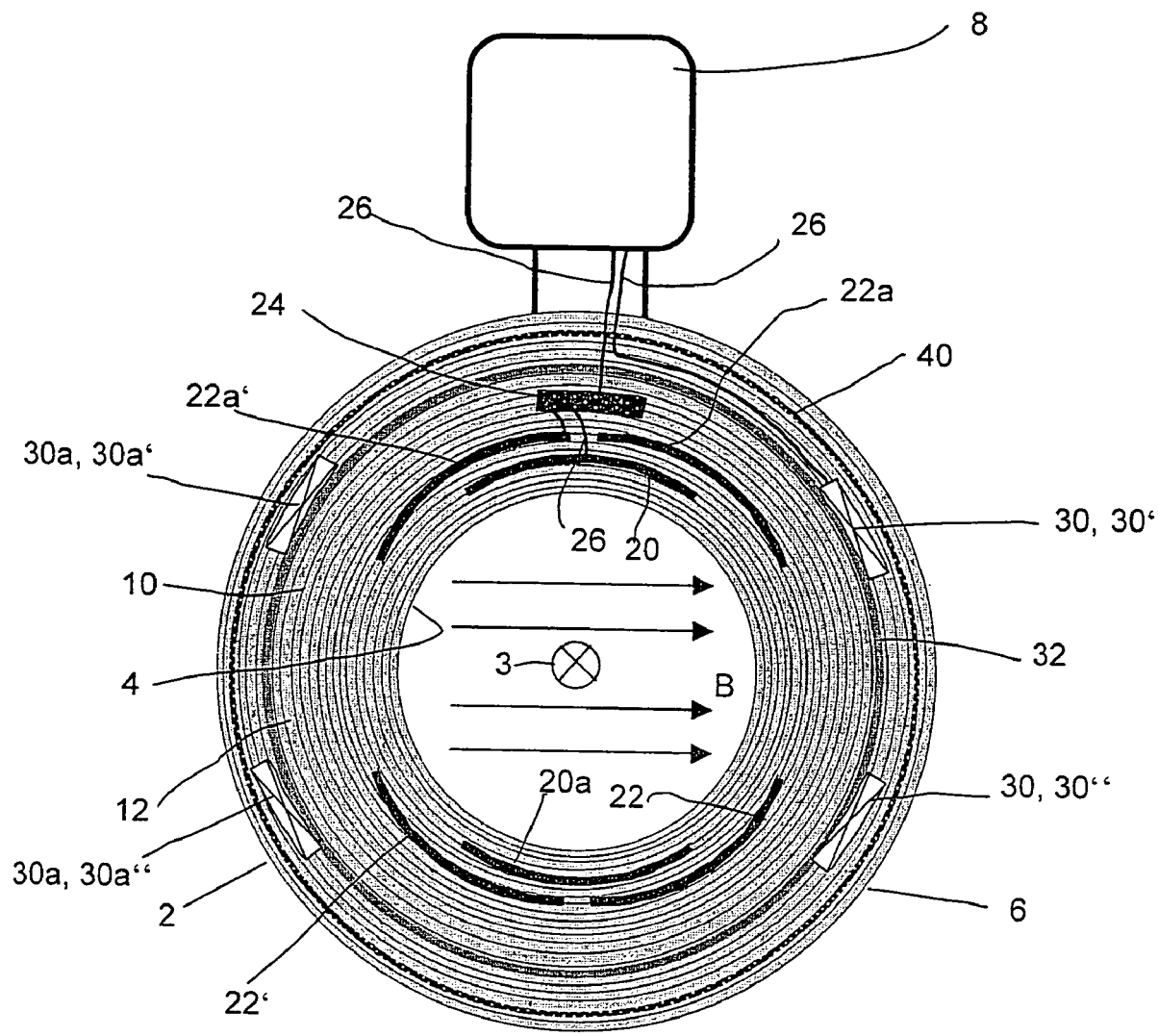

MAGNETIC-INDUCTIVE MEASURING DEVICE FOR FLOWING SUBSTANCES AND METHOD FOR ITS PRODUCTION

The invention relates to a magnetic-inductive measuring device for flowing substances—also referred to hereafter as MID for short, and to a method for producing a magnetic-inductive measuring device for flowing substances.

Magnetic-inductive measuring devices for flowing substances have long been known in the prior art. The basic construction and the operating principle are described for example in the Lexikon der Mess-und Automatisierungstechnik [Lexicon of measuring and automation technology], by Elmar Schrufer, VDI-Verlag Dusseldorf 1992, pages 262–263. On account of the operating principle, magnetic-inductive measuring devices can be used only for measuring the through-flow of electrically conductive fluid substances. However, there are also known devices today in which a detection as to whether the measuring tube is fully or partly filled or not filled takes place in addition to the flow measurement.

The simple and robust mechanical construction, in particular the straight measuring tube without built-in obstacles or moving parts, makes them preferred measuring devices for use in a series of industrial process installations, for example in the area of water management (flow measurement in drinking water preparation and sewage treatment), in the area of the chemical and petrochemical industry (flow measurement of water, acids, alkaline solutions, etc.), in the area of the pharmaceutical industry and in the area of the food industry (flow measurement of water, juices, beer, milk-products, etc.).

The wide range of possible applications is reflected in the necessity there is today for manufacturers to stock a large number of product variants.

Magnetic-inductive measuring devices of the generic type comprise a measuring tube, which is flowed through by the substance being measured, and further subsystems attached to the measuring tube, in particular a subsystem for signal pickup, a subsystem for generating a magnetic field, known as a magnetic system for short, a housing for protection from environmental influences and a connection device for receiving the electrical interface of the measuring device.

Today, the measuring tube is generally a steel tube, with or without end flanges, with connecting elements welded onto the outer circumference of the measuring tube for the mounting of other device components and subsystems on the measuring tube. Installation in the process pipeline system may take place either by flange mounting, or else by intermediate-flange mounting, known as wafer mounting.

Magnetic-inductive measuring devices are today used in applications with a process pressure of up to 40 bar, which imposes very high requirements on the compressive strength and resistance to deformation of the hydraulic system. Pressure-induced deformations, vibrations and other loads in the hydraulic system can lead to distortions and geometrical displacements in signal pickup and magnetic systems that are attached to the measuring tube and impair the measuring accuracy and reproducibility of the measurement.

Today there are also known measuring tubes made of ceramic for niche applications, some with measuring and shielding electrodes embedded in them, and measuring tubes made of thermoplastic. However, ceramic measuring tubes are expensive and brittle, and the fastening of other subsystems on them presents difficulties. Thermoplastic tubes can only be used for low process pressures.

As the subsystem for signal pickup, today there are known conductive and capacitive signal pickups. In the case of the conductive signal pickup, the electrodes are galvanically in connection with the substance being measured. Conductive signal pickups are usually two electrodes which are introduced into the measuring tube through bores. Since the steel tube and the electrodes have to be electrically insulated from one another, it is necessary today to line the steel tube on the inside with an electrically nonconducting layer, known as the liner. This makes mounting of the measuring device very complex. Furthermore, there is the disadvantage that, because of the direct contact between the electrode and the substance being measured, and the resultant interfacial effects, different electrodes have to be used according to the measuring task, which leads to a considerable variety of the variants of the measuring devices.

In the case of the capacitive signal pickup, the electrodes are galvanically separated from the substance being measured. Extensive electrodes which are located in or behind the electrically nonconductive tube lining are used. Shielding electrodes are also provided between the measuring electrode and the measuring tube to prevent capacitive feedthrough to the outside.

It is difficult to realize capacitive signal tapping on measuring tubes made of steel, because of the capacitive interaction of the steel tube with the electrical field of the electrodes. Although a capacitive signal pickup can be realized more easily in combination with measuring tubes made of ceramic or thermoplastic, this is with the disadvantages mentioned above of the measuring tubes.

As an extension of the signal pickup system, in some magnetic-inductive measuring devices today at least one reference electrode is used for forming an electrical "earth" with the substance being measured.

The subsystem for generating a magnetic field, known as the magnetic system for short, is today generally realized by two coils with poles and a magnetic return, which are mounted around the measuring tube. The geometrical tolerances to be maintained during mounting are very small, which makes mounting complex and expensive.

The magnetic return is usually realized by a number of sheet metal strips stacked one on top of the other and riveted together. Several production steps are necessary to produce them in this form.

The housing represents a considerable cost factor in today's customary magnetic-inductive flow measuring devices (MID), because it is realized either from separate half-shells, produced for example by the diecasting method, or else as a welded sheet-metal construction.

One technical disadvantage is that the elements within the housing, for example cables, cannot be positionally fixed by the attachment of the housing alone. Vibrations of the connection lines can lead to considerable signal disturbances and consequently measuring inaccuracies, in particular in the case of capacitive signal pickups.

The connection device for receiving the electrical interface of the measuring device makes it possible for the measuring device to be connected to the evaluation electronics, which are accommodated in a subassembly that is often also referred to as a transmitter or measuring transducer. The transmitter may be spatially separate from the measuring device, or else integrated in the connection device.

Today's customary production method is characterized by relatively small sizes of the batches of each variant of the device on the one hand, and a high number of variants of the device on the other hand. The variants of the device differ for example by different measuring tube cross sections and measuring tube wall thicknesses, in order to achieve an adaptation to the flow and pressure ranges of the respective application. Since the subsystems for signal pickup and magnetic field generation are mechanically built onto the hydraulic system, each variant in the hydraulic system also requires different mounting kits for the built-on subsystems.

It is therefore the object of the present invention to provide a magnetically inductive measuring device which can be produced at low cost and covers the entire range of applications with only a very small variety of variants.

Therefore, according to the invention, at least one of the subsystems of a magnetic-inductive measuring device is entirely or partly formed by layers of fibre composite material and/or is embedded in layers of fibre composite material.

According to a preferred embodiment of the invention, the measuring tube is entirely or partly formed by layers of a fibre composite material, in particular an electrically nonconductive fibre composite material.

A glassfibre reinforced plastic (GRP) comes into consideration in particular as the fibre composite material. The measuring tube may advantageously be produced by means of a fibre winding technique known from composite material technology for the production of other components. However, another layer building-up technique, known from composite material technology, may also be used.

A measuring tube according to the invention, with a measuring tube formed by the fibre winding technique, combines mechanical stability and compressive load-bearing capacity with chemical resistance and electrical insulating properties. It has been found that, if it is of a suitable diameter, a measuring tube produced by the fibre winding technique from GRP material already withstands an internal tube pressure of 40 bar for a long period without inadmissible mechanical deformation of the tube when it has a wall thickness of a few millimetres.

Since a measuring tube formed from GRP is an electrical insulator, no additional insulating lining (liner) is required, which makes production of the measuring device much easier and much less expensive. If capacitive signal tapping is realized in connection with a GRP measuring tube, no capacitive interaction occurs between the GRP measuring tube and the measuring electrodes.

Alternatively, other production methods known in composite material technology may also be used, such as for example the Resin Transfer Moulding (RTM) method, which is based on a suitable fibre preform and subsequent impregnation with matrix resin, or the prepreg/autoclave method, which is based on preimpregnated materials.

As an alternative to glass fibres, other fibre materials, preferably materials which are electrically nonconducting but mechanically reinforce the matrix resin, such as aramid fibres, PE fibres or Kevlar for example, may also be used as the filler.

If further subsystems, such as for example a signal pickup or a magnetic system, are to be fastened on the measuring tube made of fibre composite material, this may either take place conventionally by screwing or clamping, or the components are fixed by being partially or completely incorporated during winding at certain locations by fibre composite material in strip form.

An advantageous embodiment may also be, however, that the electrode arrangement is entirely or partly formed by layers of fibre composite material and/or is embedded in layers of fibre composite material, or that the magnetic system is completely or partly formed from fibre composite material and/or is embedded in layers of fibre composite material.

If the electrode arrangement is embedded in layers of fibre composite material, the electrodes can be incorporated during winding in a simple way when winding the layers. In particular in the case of capacitive signal tapping, where extensive electrodes are usually used, a significant simplification of the production process can be brought about in this way.

The electrodes may in this case consist of bendable metal sheet, metal foil or of conductive fibre composite material, for example carbon-fibre-reinforced fibre composite material.

The dielectric properties of the resin (low dielectric losses, high dielectric constant, suitable frequency response of the dielectric constant, etc.) can in this case be adapted to the requirements of capacitive signal pickup, whereby the range variation of the possible types of product is reduced to a fraction of that which is customary and required today.

Apart from embedding the electrodes, embedding the electrical leads in layers of fibre composite material is also possible. The leads are then kept free from vibration without any great effort, which results in increased measuring accuracy and interference immunity.

Embedding in fibre composite material makes it possible to choose the distance of the measuring electrode from the medium being measured to be very small, down to the thickness of a single wound layer of fibre constant material. With the GRP materials that are usually used today, this single layer thickness lies in ranges from 0.1 to 3 mm. The proximity to the medium being measured results in a high coupling capacitance and consequently low-noise signal tapping.

If the electrodes are wound in fibre composite material, they may also be formed from perforated materials, such as, for example from perforated metal foil, metal gauze or conductive synthetic fabric. The advantage of using such materials is that the eddy currents caused in the electrodes by the alternating magnetic field of the magnetic system are reduced and constantly higher excitation frequencies can be used.

The impedance converter for signal processing, necessary for operating on the capacitive principle, may be embedded in the layers of fibre composite material in the direct vicinity of the measuring electrodes together with the latter. This ensures undisturbed signal transmission between the electrodes and the impedance converter.

The magnetic return or even the complete magnetic system may also be embedded in layers of fibre composite material, in that flexible semifinished ferromagnetic material is applied 'from a roll' together with the fibre composite material in a suitable number of repetitions. A winding method is advantageously also use here.

This makes particularly economical production possible, because, unlike in the case of the known production methods for magnetic systems, preformed parts with a specific nominal width are no longer required, but instead a standard semifinished material can be used.

In addition, technical advantages are achieved: better operating conditions can be achieved, since the eddy currents which always occur when there are changes in magnetic flux, on account of the flux distribution between many small partial areas, cannot form as well as in the case of conventional, more massive formations. This makes it possible to realize higher excitation frequencies of the pickups, and this in turn shortens the response time, producing faster systems. Furthermore, the signal-to-noise ratio with respect to the normal fluid noise is increased, so that undisturbed signals are obtained as a result.

At the same time, there is a decrease in core losses. Either operation is carried out at lower power—in comparison with conventional devices—producing an energy saving, or operation is carried out at a higher signal level—with unchanged power—again resulting in an improved signal-to-noise ratio.

A further advantage is the very good positional fixing of the ferromagnetic core if it is embedded in layers of fibre composite material. While in the case of conventional systems a great effort has to be expended in respect of constructing a system that is insensitive to vibration and resistant to shock (by mechanical means or additional adhesive bonds), this is obtained automatically and without additional effort in the case of the magnetic system embedded in fibre composite material.

The temperature distribution is likewise more favourable than in the case of conventionally produced magnetic systems, and a more uniform temperature distribution is obtained.

What is more, no additional corrosion protection has to be provided on the magnetic system, since the magnetic system is completely protected by being embedded.

It is also possible for parts of the magnetic system to be formed from fibre composite material. For example, the coil may be built up from thin layers of copper wires embedded in a fibre reinforced epoxy matrix.

An embodiment according to which the housing is formed from fibre composite material is particularly advantageous. This permits the very low cost formation of the housing as one of a number of logically successive production steps, or else as a low-cost separate production step.

After preassembly of the electrical and magnetic components of the signal-pickup subsystem and of the magnetic system, these components are surrounded by the layer realizing the housing function by applying layers of fibre composite material. The cost advantage is obtained by only little material and production time being required for this production step.

The technical advantage is obtained by all the components being permanently fixed in place in this way in an outstanding manner, since the semifinished material used adapts itself to almost any desired surface geometry.

A shielding layer against electromagnetic interference fields (EMF shielding) may be integrated in the winding of the housing by being incorporated during winding. This layer may be produced for example by a semifinished material capable of being wound, which consists of a metallic gauze or mesh, for example made of copper or the like or of conductive fibre composite materials, for example carbon-fibre-reinforced plastic.

Finally, a particularly advantageous embodiment of the invention is one in which the signal pickup and the magnetic system are embedded in the measuring tube formed by layers of fibre composite material. In the case of this embodiment, the measuring tube is firstly wound from fibre composite material, then the signal pickup and subsequently the magnetic system and the housing are wound onto it one after the other, respectively as described above. The advantage of this embodiment is that a measuring device which can be produced at very low cost but combines altogether in it all the advantages mentioned above in the description of embedding the individual systems is obtained by the consistent integration of all subsystems in layers of fibre composite material.

Further advantageous refinements and improvements of the invention and further advantages can be taken from the further subclaims.

Figure 2:
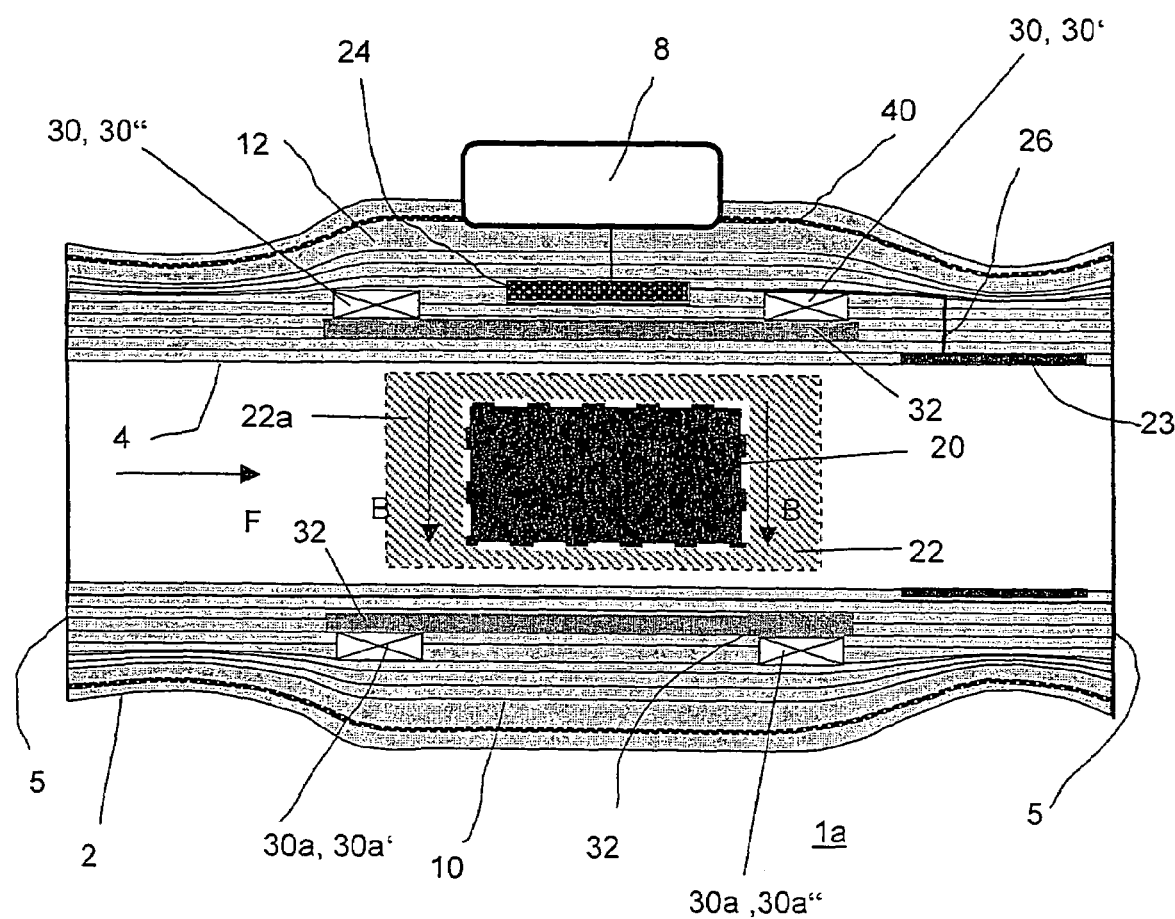
Figure 3:
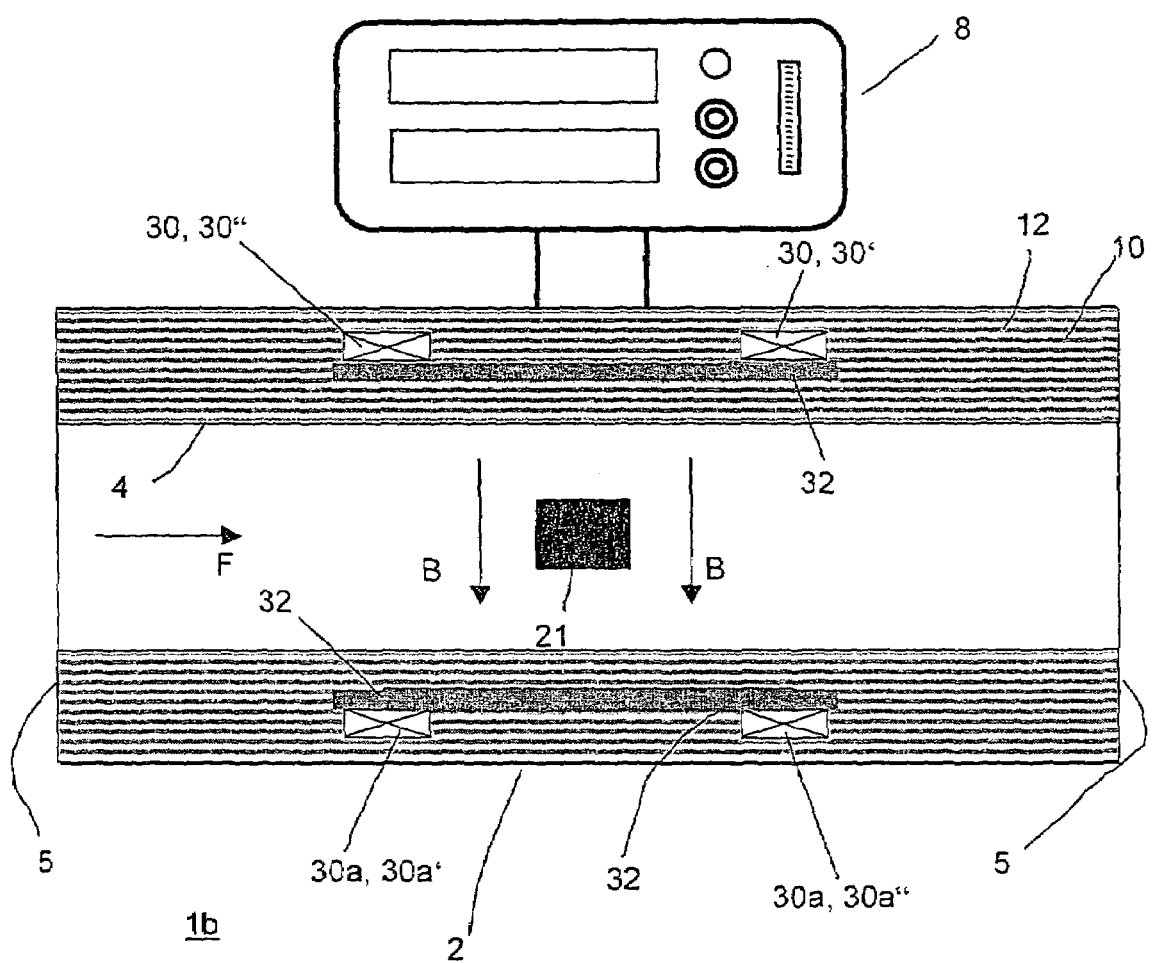
Figure 4:
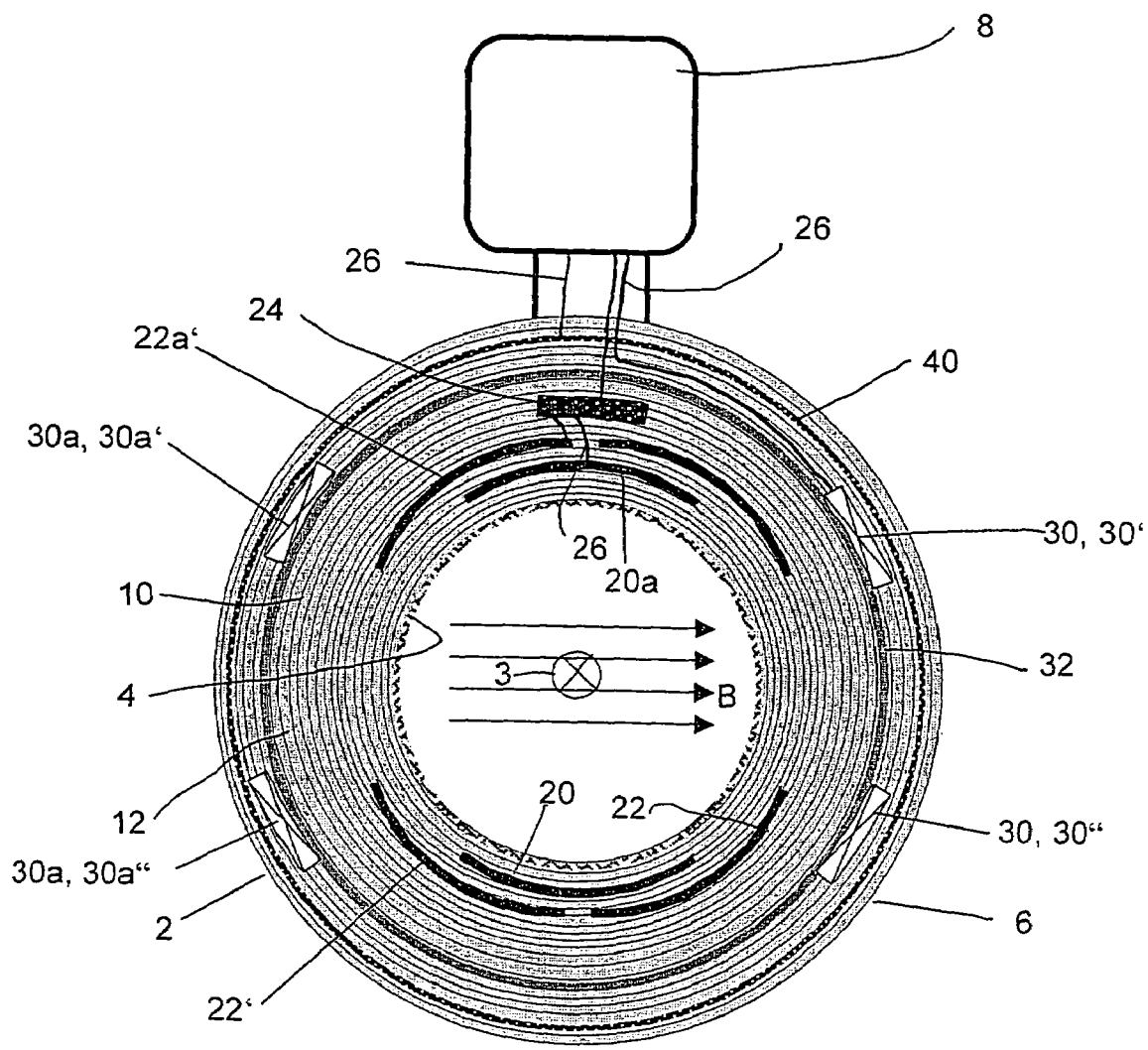
Figure 5:
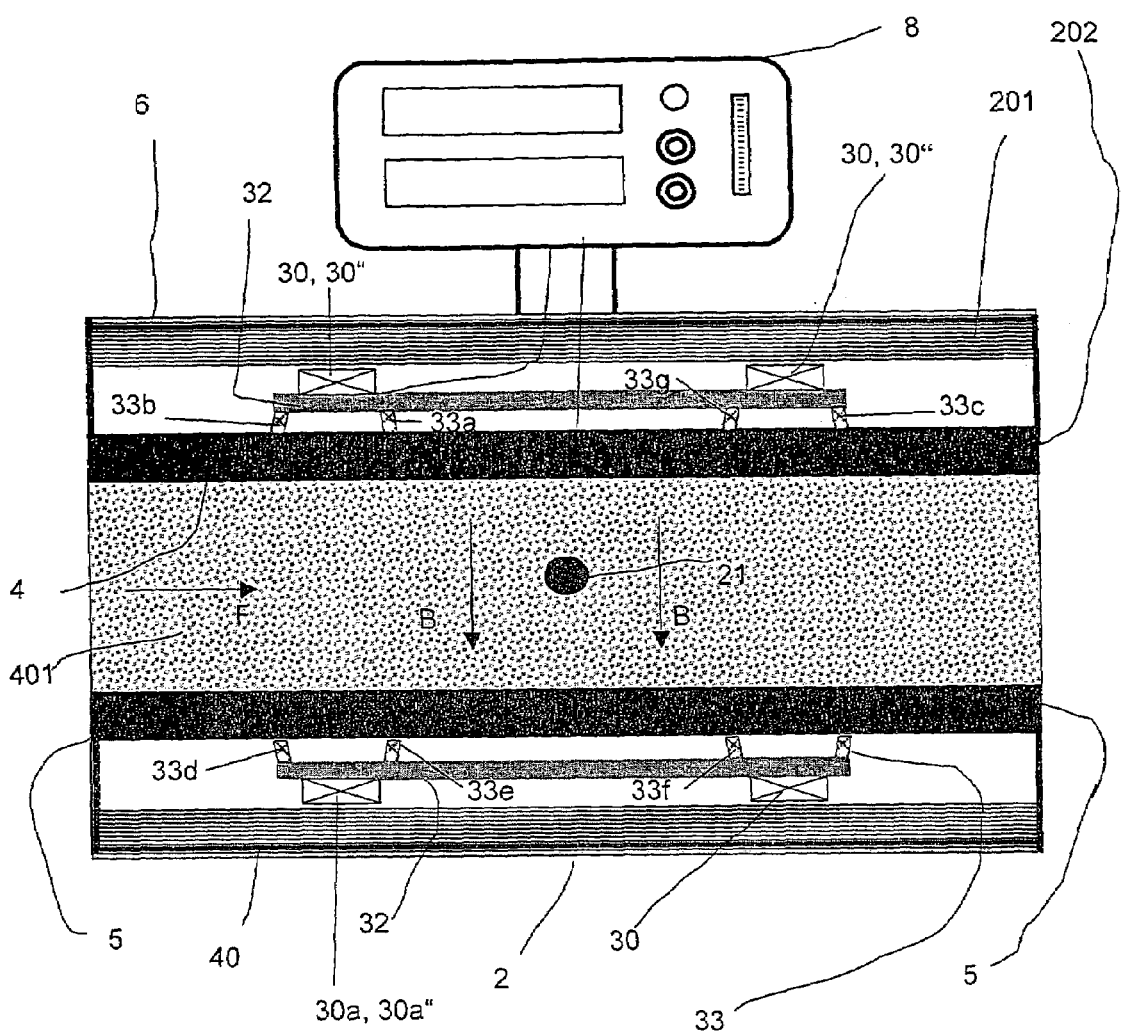
Figure 6:
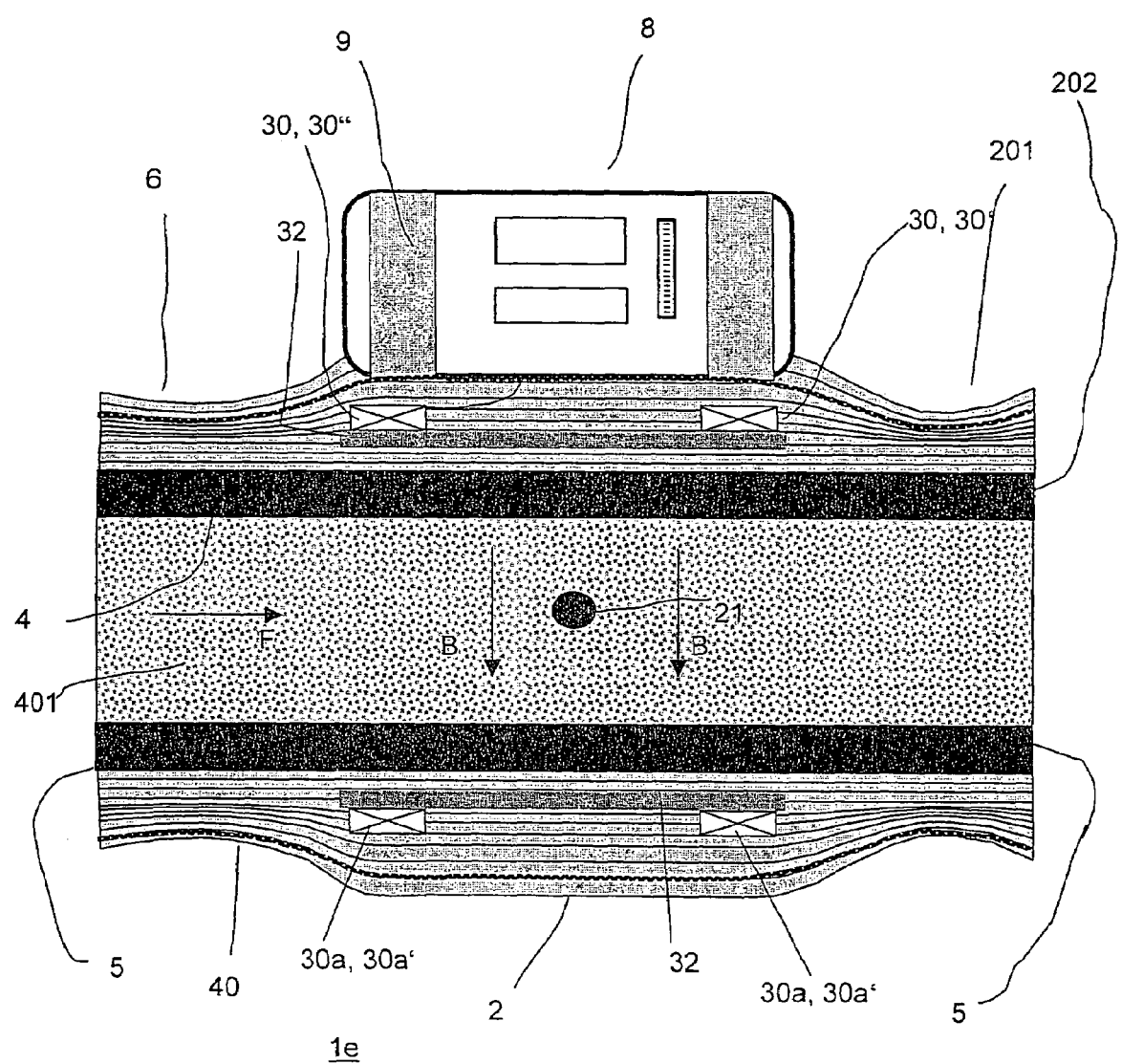
Figure 7:
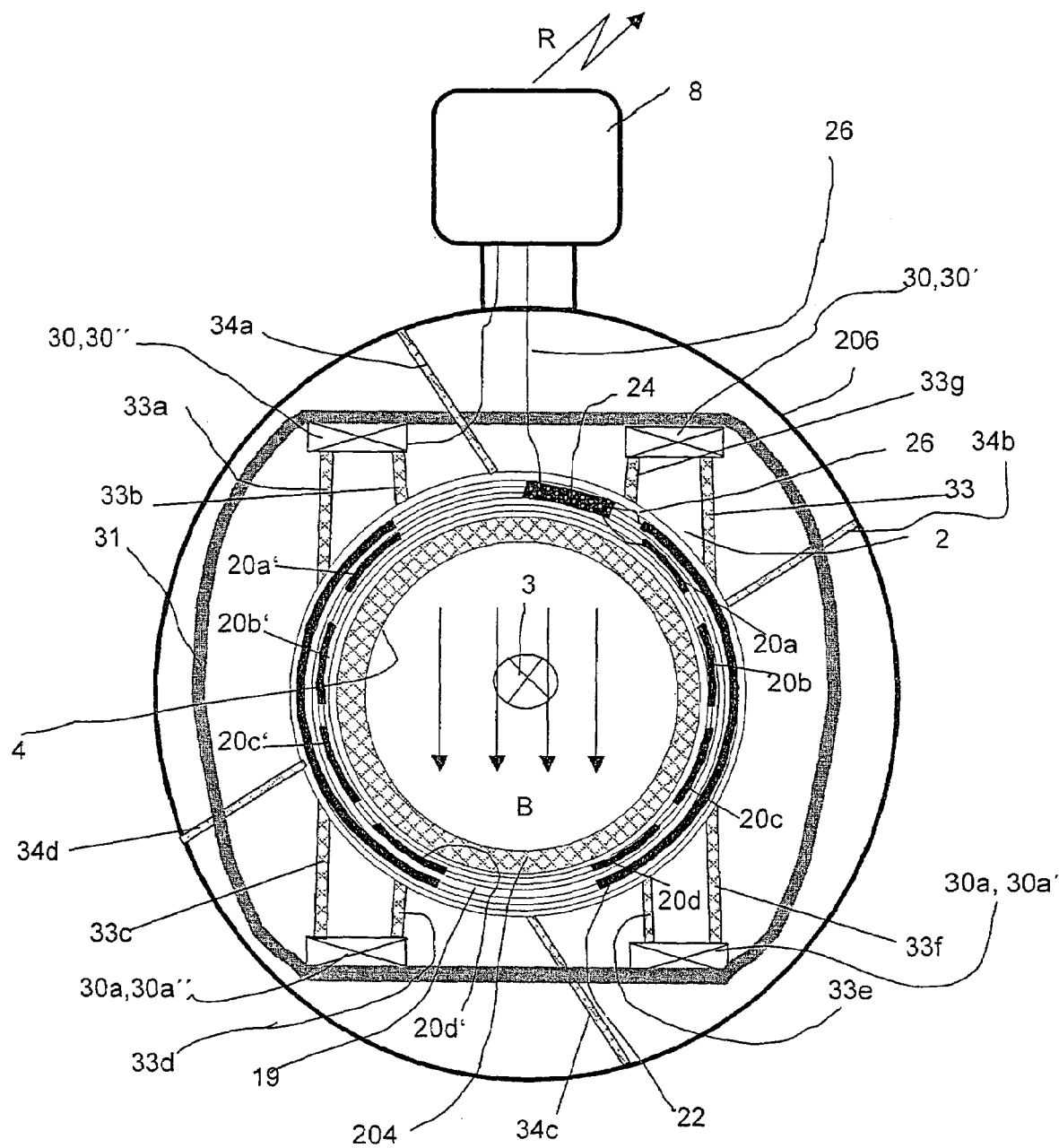
Figure 8:
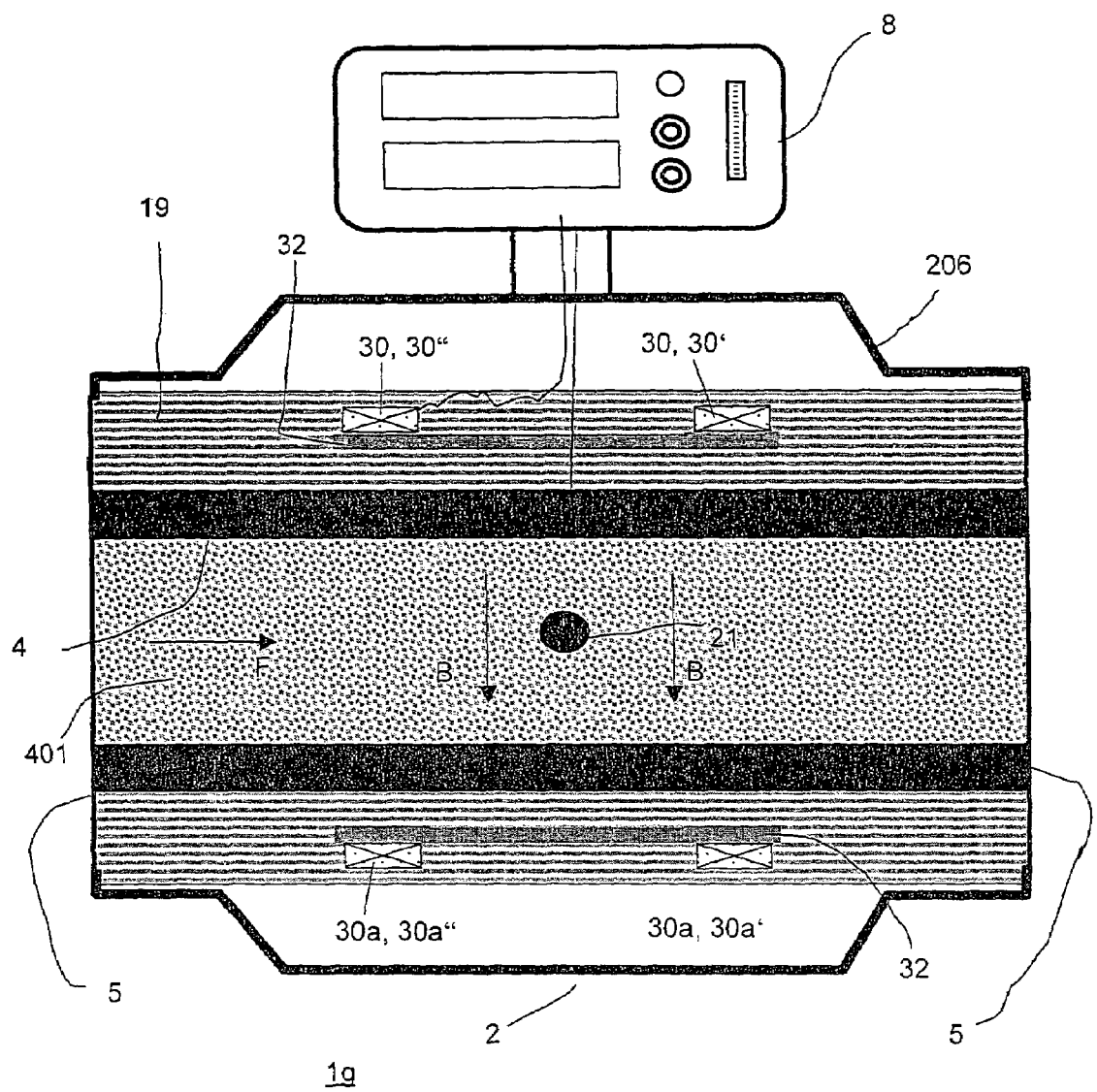
Figure 9:
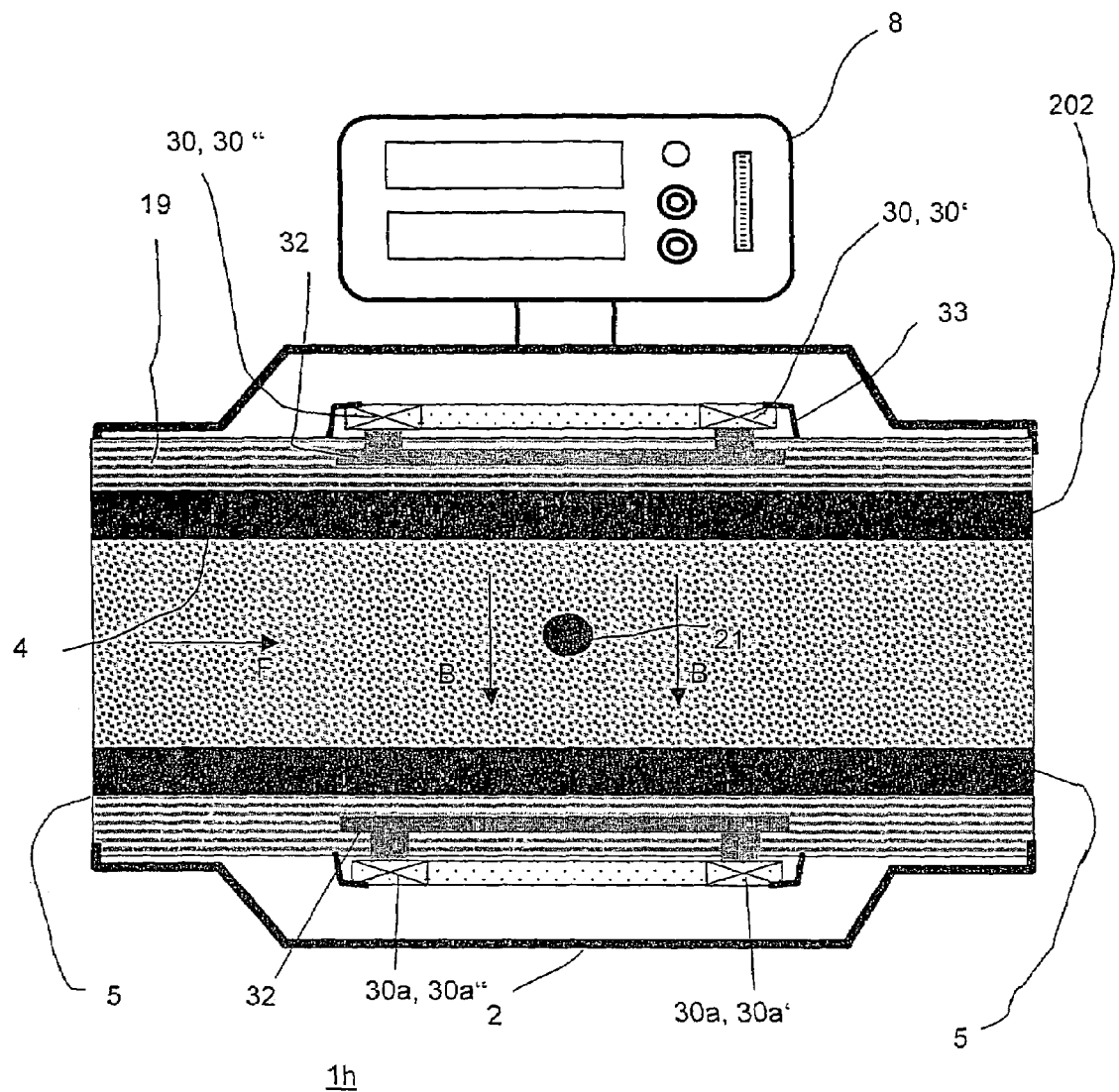
Figure 10:
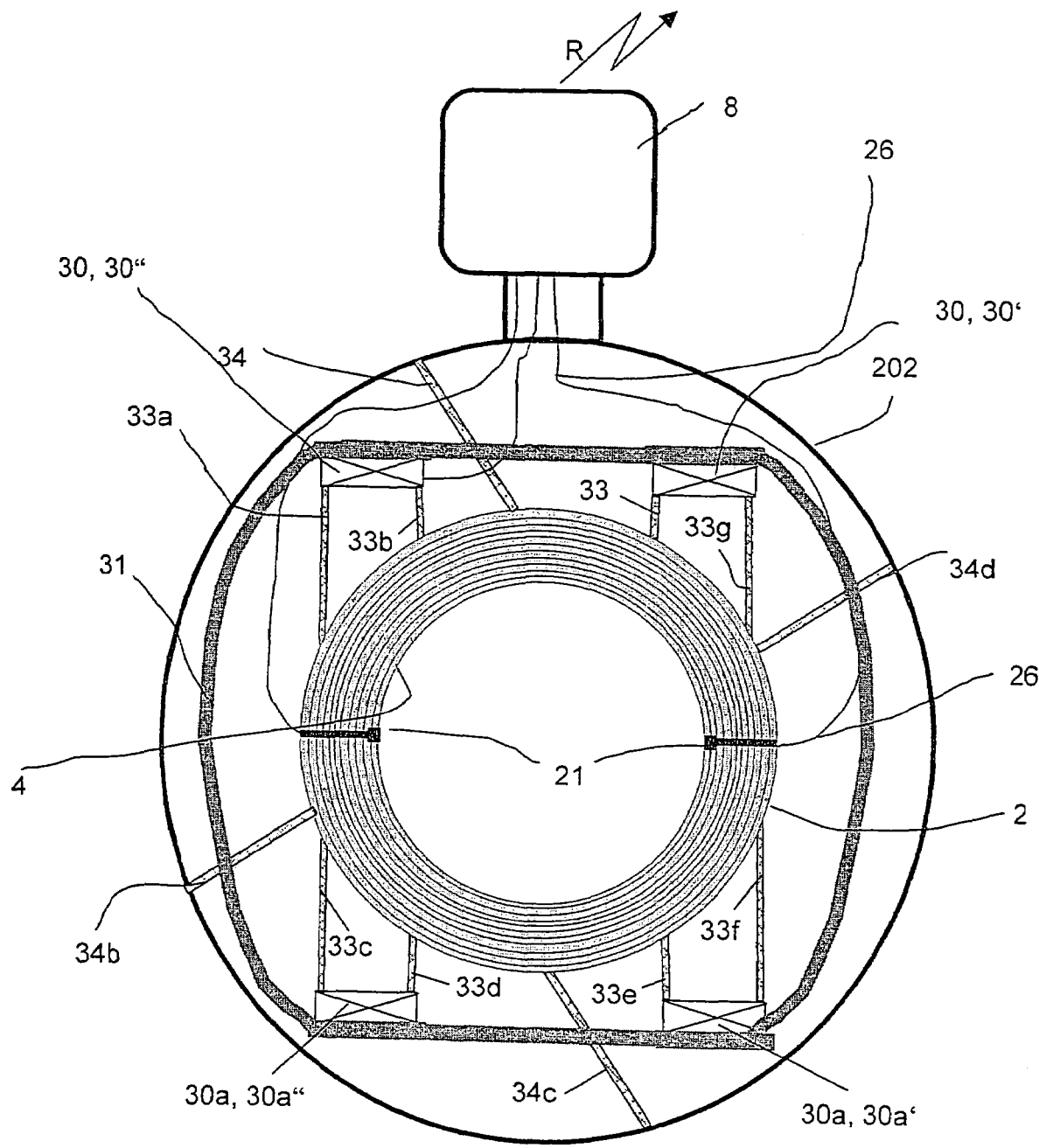
Figure 11:
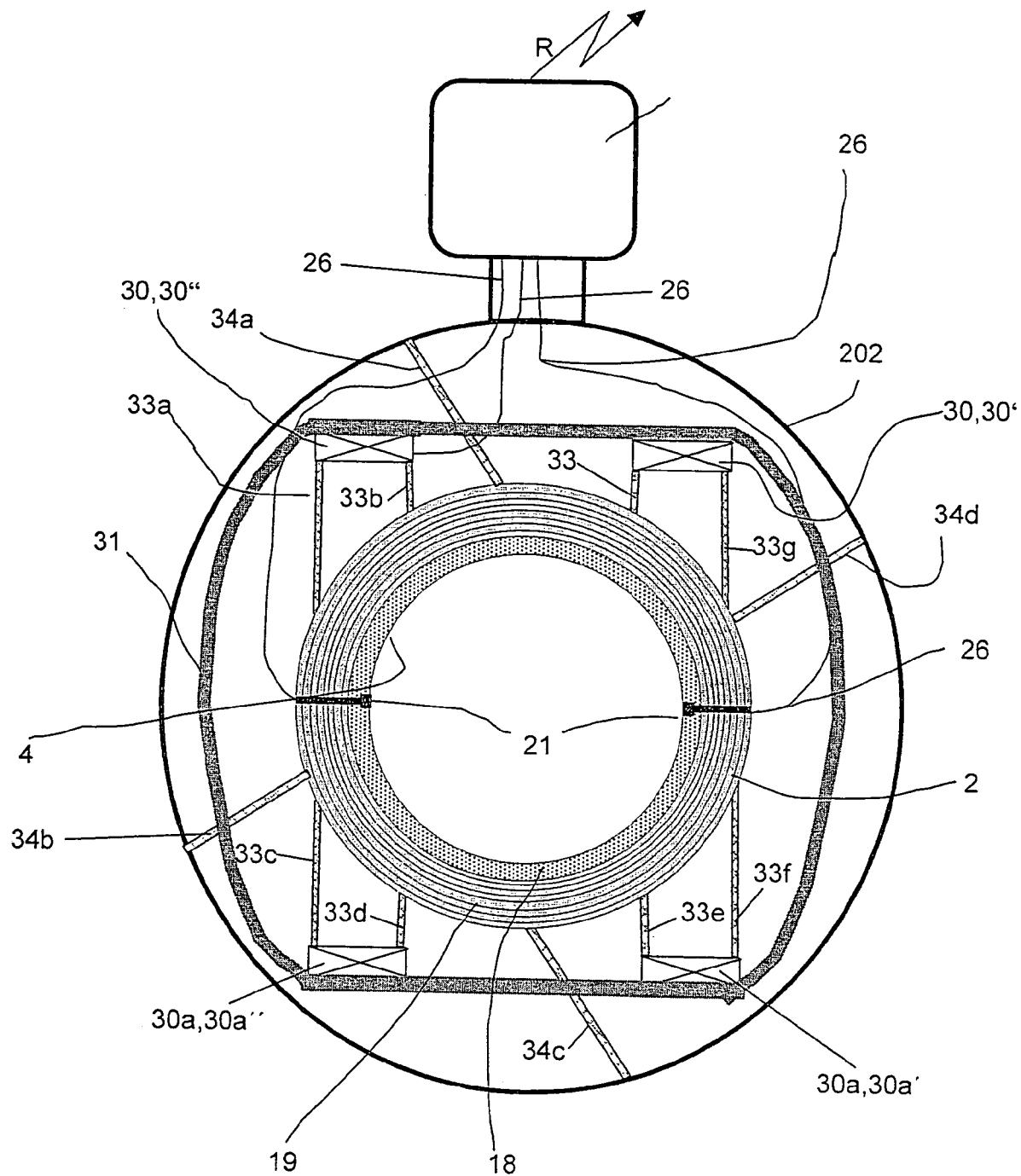
Figure 12:
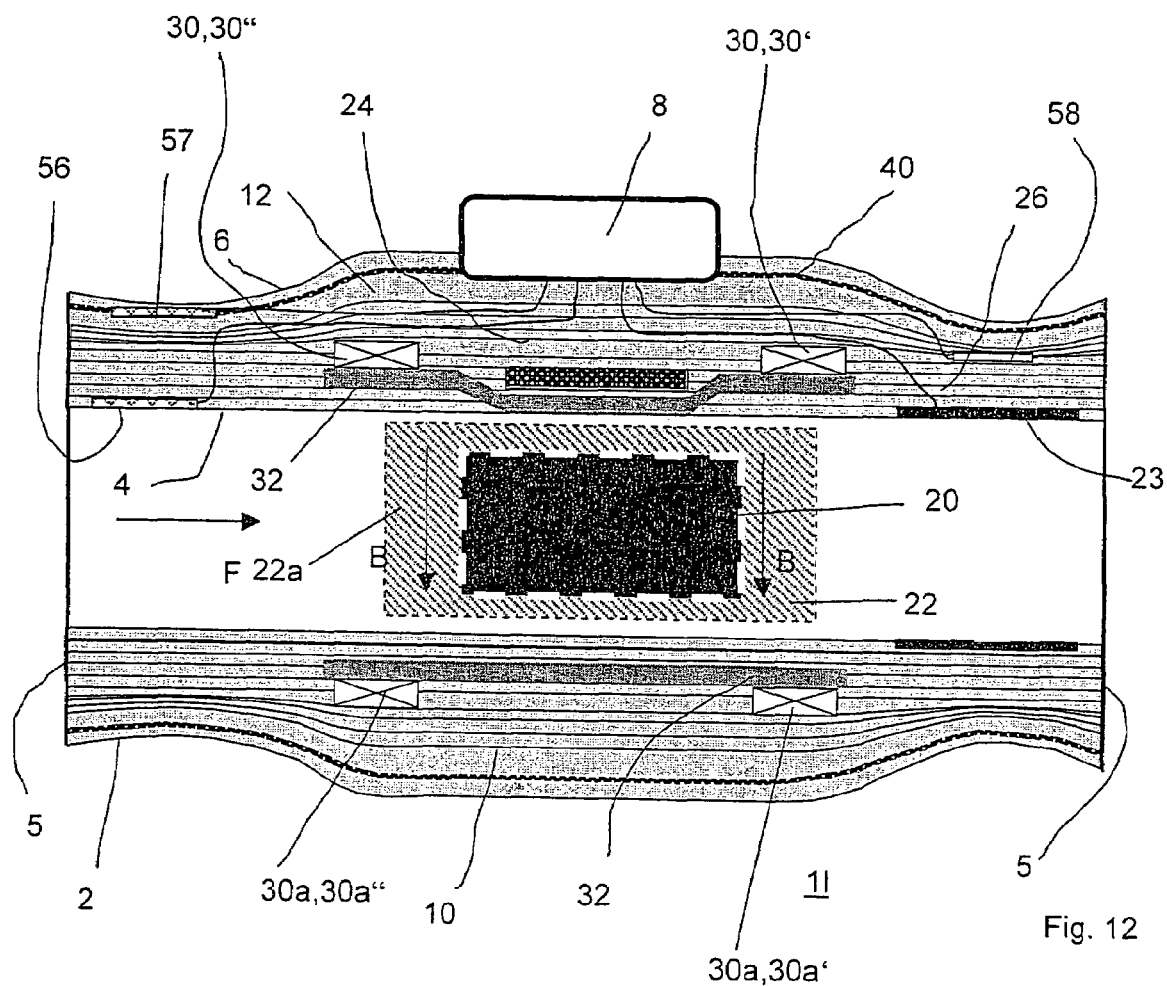
Figure 13:
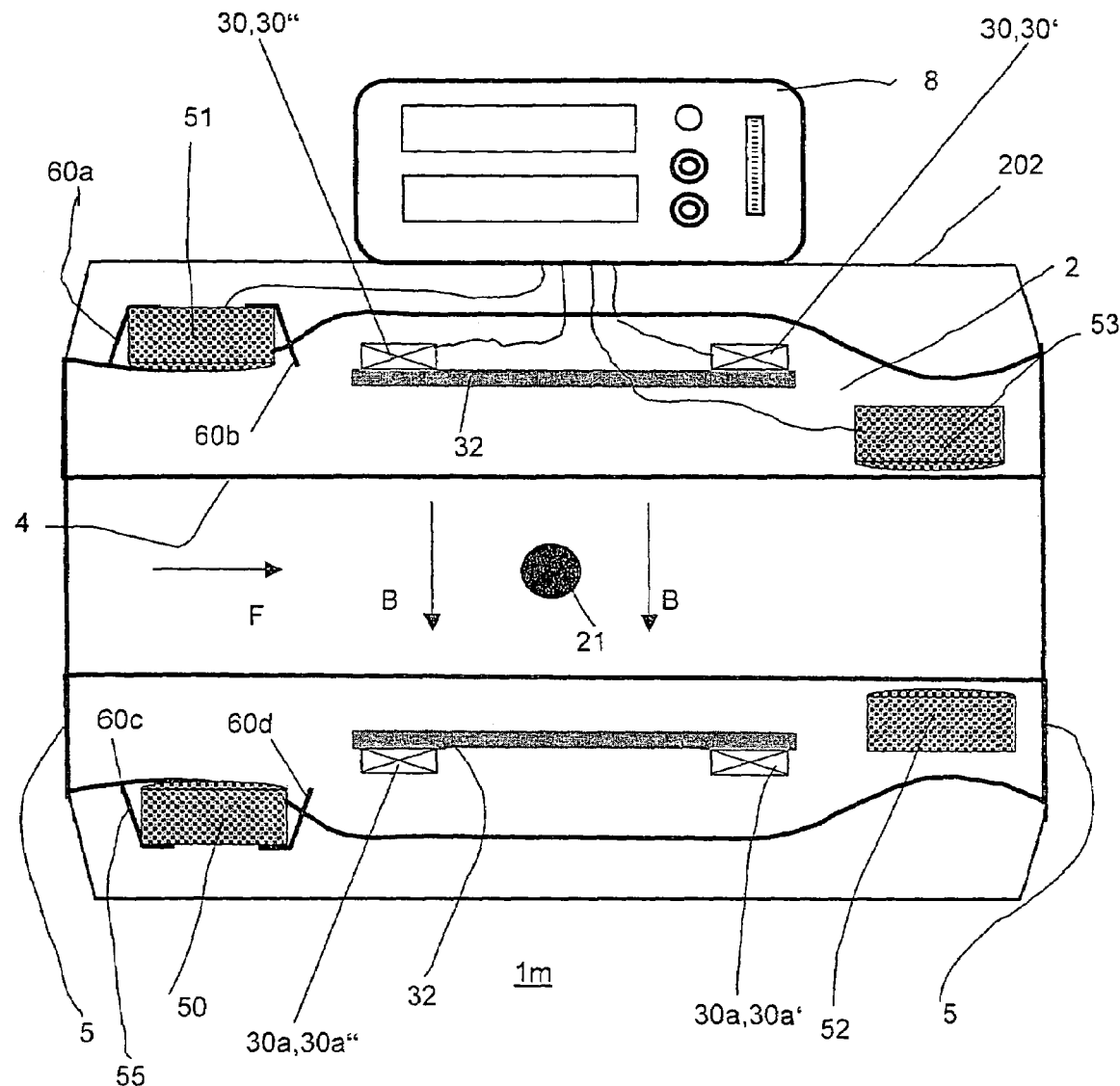

The invention and further advantageous refinements and improvements of the invention and also further advantages are to be explained and described in more detail on the basis of the drawings, in which 13 exemplary embodiments of the invention are represented and in which:

FIG. 1 shows a cross section through an MID, in which the signal pickup and magnetic system are embedded in the measuring tube formed by layers of fibre composite material, FIG. 2 shows a longitudinal section through an MID that is shown in FIG. 1 in which a reference electrode is additionally embedded, FIG. 3 shows a longitudinal section through an MID that is shown in FIG. 1 with conductive signal tapping, FIG. 4 shows a cross section through an MID that is shown in FIG. 1 in which the device bounding surface on the substance side is nanostructured, FIG. 5 shows a longitudinal section through an MID in which the housing is formed from fibre Composite material, FIG. 6 shows a longitudinal section through a further variant of an MID in which the housing is formed from fibre composite material, FIG. 7 shows a cross section through an MID in which only the subsystem for signal pickup is embedded in layers of fibre composite material, FIG. 8 shows a longitudinal section through an MID in which only the magnetic system is completely embedded in layers of fibre composite material, FIG. 9 shows a longitudinal section through an MID in which only the magnetic system is partly embedded in layers of fibre composite material, FIG. 10 shows a cross section through an MID in which only the measuring tube is formed from fibre composite material, FIG. 11 shows a cross section through an MID in which the measuring tube is partly formed from fibre composite material, FIG. 12 shows a longitudinal section through an MID in which additional sensors for temperature and strain measurement are embedded in the tube wall, and FIG. 13 shows a longitudinal section through an MID in which optical analysis devices are additionally provided.

FIG. 1 shows a cross section through a magnetically inductive measuring device 1, which comprises a measuring tube 2 with a device bounding surface 4 on the substance side and a device bounding surface 6 on the ambient side and a connection subassembly or a transmitter 8. The measuring tube 2 is formed by layers of fibre composite material, in that individual layers of semifinished fibre material 10 form a material composite with a synthetic resin 12. In FIG. 1, the layering is indicated in the cross section by concentric circles. With a different type of layering by means of continuously winding on the semifinished material, a spiral pattern would be produced.

For producing the measuring tube from fibre composite material, every method known in composite material technology can be used in an adapted form. Typical thicknesses of individual layers of fibre composite material are of the order of magnitude of 0.12 mm–3 mm.

In the MID there is a capacitive signal pickup subsystem, comprising two measuring electrodes 20, 20a, lying opposite perpendicularly in relation to the tube axis 3, and two shielding electrodes 22, 22a, respectively shielding a measuring electrode towards the outside and divided here (22, 22'; 22a, 22a') in order to keep a passage free for measuring lead 26.

The electrodes 20, 20a, 22, 22a are made of extensive metal sheets or foils with an essentially rectangular peripheral contour—in the state in which they are unwound into the plane—and arranged parallel to the measuring tube axis 3 in the form of segments of the lateral surface of a cylinder.

The electrodes 20, 20a, 22, 22a could also be formed from perforated materials, such as for example metal gauze or conductive synthetic fabric.

In FIG. 1, the measuring electrodes 20, 20a are arranged at a distance of approximately 4 winding layers from the device bounding surface on the substance side. With an assumed individual layer thickness of 0.5 mm, this would correspond to a distance of 2 mm. The fibre composite material tube with a wall thickness of 2 mm can withstand an internal tube pressure of up to 40 bar without inadmissible deformations occurring. The signal recording subsystem of the MID that is shown in FIG. 1 is therefore not exposed to any inadmissible mechanical deformations on account of the internal tube pressure.

Deformations are inadmissible in particular whenever they cause damage to the device or cause the electrodes or other parts that are attached to the tube to be displaced as a result of the deformation in such a way that the measuring accuracy is reduced.

In the vicinity of the electrodes 20, 20a, 22, 22a, an electronic signal preprocessing subassembly 24, essentially an impedance converter and a signal preamplifier, is also embedded in the layers, in the same way as the measuring signal leads 26 from the electrodes 20, 20a, 22, 22a to the signal preprocessing subassembly 24 and from the signal preprocessing subassembly 24 to the transmitter 8.

The magnetic system of the MID that is shown in FIG. 1 comprises two circular exciting coils 30, 30a and a ferromagnetic core 32 for the magnetic return. The winding planes of the annular coils 30, 30a run parallel to each other and to the tube centre axis 3. Because of the representation in cross section, only the sectional area 30', 30", 30a', 30a" of the annular coils 30, 30a can be seen.

The ferromagnetic core 32 comprises a flexible ferromagnetic metal sheet, which between the two coils 30, 30a follows an inner lateral surface of the cylinder of the measuring tube, and consequently ensures the magnetic return flow, and is embedded in the layers of fibre composite material. The exciting coils are conventionally wound coils. They are firmly embedded together with the leads 26 to the exciting coils 30, 30a in the fibre composite material.

For producing an MID according to the invention that is shown in FIG. 1, methods are borrowed from the production technique known per se for components made of fibre-reinforced plastics, here in particular the winding method. This involves running through the process steps described below.

Firstly, a first, inner layer is wound onto a cylindrical core made of metal, for example aluminium. This may consist either of resin-impregnated fibres in the form of what is known as a roving or of a semifinished fibre material in the form of for example what is known as a scrim, which has suitable individual fibre layers and is cut to size for the total width of the measuring tube.

A number of further layers are wound onto this first layer, and the measuring electrodes are fixed on top and wound around by a number of further layers of semifinished fibre material.

The measuring electrodes could also already be applied to the first layer of semifinished fibre material. In this case, the measuring electrodes would be even closer to the substance being measured, which means even greater sensitivity of the measurement.

In the case of the scrim technique, the fixing may take place for example by means of spots of adhesive. If appropriate care is taken when subsequently incorporating them during winding, a very high positioning accuracy of the electrodes is achieved.

A corresponging procedure is subsequently followed with the shielding electrodes 22, 22a, the signal leads 26 and the signal converter subassembly 24. The wall is subsequently made thicker by a number of further layers.

As the next step, the parts of the magnetic system, the ferromagnetic core and the exciting coils, are in turn initially fixed temporarily and subsequently incorporated during winding and, in this way, are definitively fastened. The exciting coils are fitted in such a way that the magnetic field in the interior of the tube runs perpendicularly in relation to the tube centre axis 3 and perpendicularly in relation to the joining line between the measuring electrodes 20, 20a, as indicated in FIG. 1 by the arrows B.

In the case of the magnetic system, very high positioning accuracy is important, in particular little twisting, if a high measuring accuracy is to be achieved. With appropriately careful winding, the achievable geometrical precision is very high. For instance, twisting of the coils and the core of less than 1° can be achieved.

Then, a number of further layers are wound on, to achieve protection of the magnetic system from environmental influences. Subsequently, a shielding layer 40 of conductive material, for example of a semifinished fibre material of electrically conductive material, such as for example of conductive carbon fibres, is also wound on, and this is again wound around with a number of final outer protective layers. The outer protective layers provide protection in particular from external influences, so that the measuring device as a whole conforms to the corresponding protection class, for example IP 68. They may in this case also consist of some other semifinished material, for example of aramid fibre reinforced material, if the measuring tube is made up of semifinished GRP material.

An additional shielding layer—not represented here— may also be embedded in the space between the electrodes and the magnetic system.

During the winding, the measuring signal leads 26 and the leads to the coils 30 and to the signal converter subassembly 24 must be led through between the individual winding layers.

Then, a connection device 8 is fastened on the finished-wound measuring tube. This may take place either by screwing or adhesive bonding, or else again by incorporation during winding with semifinished material in strip form, so that the connection bushes and any operator control and display elements remain free.

The connection device 8 may in this case either serve merely for contacting and itself contain no electronic subassemblies but only connection elements with which the measuring device is electrically connected to its system surroundings (energy supply and signal derivation). It may, however, also already contain various functional subassemblies for signal processing, filtering, storage and transmission—either via bus cables or else wirelessly by means of radio transmitters, Bluetooth or other common signal transmission protocols—and is then usually referred to as a transmitter.

Finally, as the last step, the core is removed again, in that it is pulled out from the finished-cured tube. Known techniques, such as for example warming up the core, may be used to assist this.

One variant of the production method is that a cylindrical hose made of liner material, for example thermoplastic, is used as the core. The hose is brought into the required cylindrical form by for example being subjected to compressed gas (compressed air for example). After applying the fibre composite material with all the embedded components and subsystems to the liner, the liner core can be removed again by pulling it out.

In a further embodiment, not represented here in a figure, the liner remains inside the measuring device after the layers of fibre composite material have been applied.

As a result, in this variant a measuring device of the generic type, made of fibre composite material with a conventional liner, is obtained in this way.

FIGS. 2 to 13 show a number of variants, not to be considered exhaustive, of the embodiment that is shown in FIG. 1 and presented in detail above. It is therefore intended essentially to discuss below the parts that are different from the embodiment that is shown in FIG. 1. Similar or equivalent parts or subassemblies are in this case respectively designated by the same reference numerals.

FIG. 2 shows a longitudinal section through an MID according to the invention with capacitive signal tapping. The broken outline around the measuring and shielding electrodes 20, 20a, 22, 22a indicates that they are embedded behind the first winding layer of the measuring tube 2; they have no direct contact with the substance being measured.

Otherwise, the construction of the measuring device that is shown in FIG. 2 corresponds essentially to that as shown FIG. 1, with the addition that an annular reference electrode 23 has been embedded on the inner side of the measuring tube, so that it is in electrical contact with the substance being measured. A signal lead leads from the reference electrode 23 to the signal converter subassembly 24. In some measuring configurations, it is necessary to introduce the reference potential for the measurement into the substance being measured, for which purpose the reference electrode 23 serves.

The reference electrode 23 is produced from a metal sheet, a piece of metal foil or from electrically conductive semifinished fibre composite material, in that it is placed directly on the core and subsequently enclosed by the first winding layers. After removal of the core, the reference electrode then has galvanic contact with the substance being measured.

The surface contour of the measuring tube 2 can be configured within wide limits on the basis of the winding technique. For instance, FIG. 2 shows as an example a measuring tube with thickening on both lateral sealing faces 5 and towards the middle, with a convex constriction respectively lying in between. The connection device 8 is partly let into the wall of the measuring tube and adhesively fixed or pressed in it.

The integration of the measuring device that is shown in FIG. 2 takes place for example by wafer mounting or the intermediate-flange installation technique.

FIG. 3 shows a variant of an MID according to the invention, which differs from that that is shown in FIG. 1 essentially in that a conductive signal tap is realized. The measuring electrodes 21, 21' are in galvanic contact with the substance being measured, the direction of flow of which in the measuring tube 2 is indicated by the arrow F. It is indicated in FIG. 3 as a rectangular electrode, but may of course be shaped in almost any form desired, for example including round or oval. Its extent is much less than that of the capacitive electrode; it usually has a diameter of several mm to several cm. The measuring electrode 21 is also embedded in the layers of fibre composite material, by a similar method as that described in the case of FIG. 2 for embedding the reference electrode. The material to be chosen for the measuring electrode 21 is defined to correspond to that of conventional MIDs and is dependent on the intended application.

Since, however, in the case of a construction of the MID according to the invention that is shown in FIG. 3 the measuring tube is formed from electrically nonconducting fibre composite material, there is no longer the necessity to include an insulating lining (a liner) when applying the conductive principle. The measuring electrode 21 may be embedded directly in the material of the tube wall, together with the magnetic system 30, 30', 30", 30a, 30a', 30a", 32, 32', 32", which considerably simplifies the production of such a measuring device.

The embodiment of an MID according to the invention shown in FIG. 4 differs from that shown in FIG. 1 in that the device bounding surface 4 on the substance side is nanostructured and formed with reduced adhesiveness, for example in the manner of a lotus leaf surface. The advantage is that it provides the media-contacting inner surface of the tube with a self-cleaning effect and is less susceptible to deposits from the substance being measured. The self-cleaning effect on the principle of the lotus leaf surface is based on the fact that the surface has structures on the nanometre scale, by which a certain ratio of surface tension to adhesive force is produced when particles from the substance being measured are deposited, with the result that the effective adhesive force of the particles on the surface is greatly reduced. The particles can consequently already be carried away again by the normal flow of the substance being measured, whereby the inner tube surface 4 is repeatedly self-cleaned.

The nanostructure on the device bounding surface 4 on the substance side may be produced for example by a corresponding matrix being applied to the surface of a cylindrical metal core and the structure then being moulded in the first layer of fibre composite material during the winding thereof. Another possibility would be to apply a thin layer of plastic to the cylindrical metal core as a first layer, for example by spinning or immersion, into which the nanostructure of the matrix is moulded. Subsequently, the first layer of fibre composite material is applied on top. The device bounding surface on the substance side would then be formed by the thin, nanostructured layer of plastic; the mechanical stability and the supporting function for the other subsystems would be ensured by the structural material that is the fibre composite material.

FIG. 5 shows an exemplary embodiment of the invention in which only the housing 201 is formed from fibre composite material; the other subsystems, on the other hand, are conventionally constructed. In particular, the measuring tube 202 is a measuring tube made of steel which is aligned on the inside with a plastic lining 401 (liner). A magnetic system with two exciting coils 30, 30a and a ferromagnetic core 32 is attached by means of known mounting means 33a, 33b, 33c, 33d, 33e, 33f, 33g—that is supports, bolts, screws, clamps and similar parts, which are only schematically indicated in FIG. 5 and need not be described in any more detail here since they are sufficiently known to a person skilled in the art of constructing MIDs—to the outer side of the measuring tube. The signal tapping takes place conductively by means of two opposing electrodes 21, only one of which is visible and which are attached perpendicularly in relation to the tube centre axis F and the direction of the magnetic field B, are in galvanic contact with the measuring medium and electrically insulated by the steel tube. A housing 201 comprising layers of fibre composite material is formed around the magnetic system on the basis of the method described above. A shielding layer 40 of conductive material has also been introduced into the housing. The hollow-cylindrical form of the housing that is represented in FIG. 5 is only one of a number of shaping possibilities obtained by the layer building-up method by means of fibre composite material. The layers forming the housing may also adapt themselves more or less to the contour of the magnetic system.

The embodiment shown in FIG. 6 comprises a conventional steel measuring tube 202 with a liner 401 and conductive signal tapping via electrodes 21 galvanically contacting the substance being measured. Here—as a difference from the embodiment according to FIG. 5—the magnetic system with exciting coils 30, 30a and ferromagnetic core 32 is embedded—for example on the basis of the method described above under FIG. 1—in the layers forming the housing, and similarly the shielding layer 40. The transmitter 8 is partly let into the uppermost layers of the housing on its underside and is fastened on the housing on its two outer sides, in that it is as it were wound firmly in place, by two fastening strips 9 which are also formed from fibre composite material and applied in the same winding process in which the housing is also built up.

It goes without saying that the measuring tube 202 in the embodiment according FIGS. 6 and 5 could also consist of ceramic, with capacitive signal tapping electrodes embedded or attached to it.

The embodiment according to FIG. 7 represents an MID in which only the subsystem for measuring signal recording, formed as a capacitive signal tapping system, is embedded in layers of fibre composite material, whereby fibre composite embedding 19 of the measuring system is produced, whereas the other subsystems are constructed in a conventional way. Here, the measuring tube 204 is a ceramic tube, but it could also be a thermoplastic tube. Measuring and shielding electrodes 20, 20a, 22, 22a are also embedded in layers of fibre composite material on the measuring tube—for example on the basis of the method described above under FIG. 1, together with the signal leads 26 and a signal converter subassembly 24 (not all the signal leads are depicted in FIG. 7 for reasons of overall clarity). Firstly, one or more layers of fibre composite material are applied directly to the measuring tube, before the measuring electrodes 20, 20a are then applied.

In the exemplary embodiment of FIG. 7, a multielectrode arrangement with 4 pairs of measuring electrodes 20a, 20a', 20b, 20b', 20c, 20c', 20d, 20d', is shown by way of example, the pairs of measuring electrodes 20a,b,c,d respectively covering a segment of the inner lateral surface of the measuring tube. With such a multielectrode arrangement, it is possible to perform in addition to the flow measurement also a recording and measurement of the filling level. This kind of filling, level recording and measurement by means of capacitive multielectrode arrangements is known in principle in the prior art. It is not restricted to four pairs of measuring electrodes; it is also possible for three, four, five, six, seven, eight or even more pairs of electrodes to be arranged. With the combination of this type of measurement with the embedding of the pairs of measuring electrodes in layers of fibre composite material shown in the exemplary embodiment that is shown in FIG. 7, the great advantage is obtained that the pairs of measuring electrodes can be positioned very precisely, are held immovably after the embedding, the measuring leads can no longer vibrate or slip and the impedance conversion and signal preamplification close to the electrodes in the signal converter subassembly 24 result in an increase in the measuring accuracy with reduced production effort.

In the embodiment that is shown in FIG. 7, the magnetic system is conventionally constructed from exciting coils 30, 30a and a ferromagnetic core 31 for the magnetic return, and is fastened on the fibre-composite embedding 19 by fastening means 33a,b,c,d,e,f,g. The housing 202 is also a conventionally constructed metal housing, attached by means of housing constructing means 34a,b,c,d.

Here, the transmitter 8 comprises a wireless signal transmission unit, for wireless signal transmission—indicated by the arrow R—and consequently wireless incorporation of the MID in a higher-level process control system.

In the embodiment represented in FIG. 8, only the magnetic system with exciting coils 30, 30a and ferromagnetic core 32 is completely embedded in layers of fibre composite material—for example on the basis of the method described above under FIG. 1. The fibre composite embedding 19 produced in this way surrounds a conventional steel measuring tube 202 with lining 401 and conductive electrode 21. In this embodiment, the housing 206 is also formed in a conventional way from metal. The advantage of this embodiment lies in the low-cost way in which it can be produced with very high geometrical precision of the magnetic system, while retaining tried-and-tested subsystems for the measuring tube, signal tap and housing.

FIG. 9 shows a longitudinal section through an embodiment of an MID according to the invention in which the magnetic system is partly embedded in layers of fibre composite material. The ferromagnetic core 32 is embedded in layers of fibre composite material, the exciting coils 30, 30a are fastened on the resulting fibre composite embedding 19 by fastening means 33a,b,c,d,e,f,g. The exciting coils 30, 30a could also be embedded in the fibre composite embedding 19 and the ferromagnetic core could be mounted on top in a conventional way.

The embodiment that is shown in FIG. 9 still offers cost-advantages and increased geometrical precision in the fastening of the magnetic system in comparison with a conventional manner of constructing an MID, and at the same time requires less extensive modification of the production method than the embodiments represented in FIG. 8 or 6.

FIG. 10 shows a cross section through an embodiment according to the invention of an MID in which only the measuring tube is formed by layers of fibre composite material, and the remaining subsystems such as the signal tap, magnetic system and housing are constructed and mounted in the conventional way. The pair of conductive signal electrodes 21 are embedded in the measuring tube 2 of fibre composite material. This embodiment offers the advantage that the measuring tube of fibre composite material is electrically nonconducting and of high mechanical stability, resistance to deformation under compressive loading and at the same time high chemical resistance. There is no longer the necessity to apply an inner lining layer. Since, with MIDs produced in accordance with the current state of the art, the measuring tube makes up a very high proportion of the overall production costs of the device, the embodiment shown in FIG. 10 already permits significantly lower-cost production, while retaining tried-and-tested methods for producing the other subsystems and with little change of the production processes.

In the case of the embodiment of an MID according to the invention shown as a cross-sectional view in FIG. 11, the measuring tube 2 is partly formed from fibre composite material, partly from some other material. The inner part 18 of the measuring tube consists for example of thermoplastic, in which a pair of electrodes 21 in galvanic contact with the substance being measured are embedded as a conductive signal tap. Applied around the inner tube of thermoplastic are layers of fibre composite material—fibre composite embedding 19—for example on the basis of the method described under FIG. 1, the inner tube of thermoplastic then serving as a core instead of a removable metal core, and unlike the latter remaining in the device. Forming the outer tube part from fibre composite material has the overall effect of providing the measuring tube with mechanical stability, compressive strength and deformation resistance which the thermoplastic tube alone does not have. The advantage of this embodiment is that it is possible to revert to possible existing production of very inexpensive thermoplastic tubes, into which no lining for insulation from the substance being measured has to be introduced of course, and the disadvantage of the low compressive strength of the thermoplastic tubes is then overcome by surrounding them with layers of fibre composite material. The other subsystems such as the magnetic system and the housing are produced conventionally. The modification in the production line that is introduced is very minor.

All the customary MIDs that are available today are directed at measuring the through-flow of flowing substances and, what is more, do not have any additional measuring means by which additional information can be derived from the substance being measured or the measuring device itself concerning other measured variables, and be used for example for diagnostic purposes. FIG. 12 shows a longitudinal section of an embodiment of an MID according to the invention which overcomes this disadvantage of the prior art. The measuring device that is shown FIG. 12 corresponds essentially to that shown and described in FIG. 2. In addition, however, in the embodiment that is shown in FIG. 12 further sensors are also embedded in the layers of fibre composite material.

Near the device bounding surface 4 on the side of the substance being measured, a first temperature sensor 56 is embedded. In the case of the method of building up layers that is described under FIG. 1, it is fixed at a suitable location and wound around, by analogy with the procedure when embedding the reference electrode 23 or the measuring electrode 20, 20a. The first temperature sensor 56 may be embedded very near the device bounding surface 4 on the side of the substance being measured or else directly in contact with the substance being measured, so that with it the temperature of the substance being measured can be recorded well on the inner wall of the tube. All common types that are also available today in miniaturized form come into consideration as the temperature sensor, such as for example resistive temperature, sensors, thermocouples or semiconductor temperature sensors.

Near the device bounding surface 6 on the ambient side, a second temperature sensor 57 is embedded. With this, the tube wall temperature or the ambient temperature of the measuring device can be recorded. The processing of the sensor signals of the two temperature sensors takes place in the transmitter 8, but could also be already performed in the signal converter subassembly 24.

With knowledge of the geometry and the material properties of the fibre composite material, the difference between, the temperature values determined by the two temperature sensors 56, 57 can be used to calculate the thermal flux, and from it the energy exchanged between the substance being measured and the ambience. In this way it would be possible to monitor maintenance of the permissible operating limits of the device. The remaining service life of the measuring tube or of the entire measuring device could also be estimated on the basis of the tempterature values recorded. For this purpose, additionally integrated in the transmitter 8, or already in the signal converter subassembly 24, is a microprocessor with a memory, in which a corresponding service life model is implemented as software. The measured temperature values are stored there; the historical variation of the temperatures is then supplied to the service life model as an input variable, and the remaining service life to be expected is calculated and passed on via the transmitter for display or further processing in a higher-level process control or plant management system.

The first further measuring pickup 56 may also or additionally be a pressure sensor. It would be embedded on the basis of a method as described under FIG. 1 into the layers of fibre composite material with hydraulic contact with respect to the substance being measured inside the tube. With such a measuring device, the pressure and through-flow of the flowing substance could be measured at the same time.

Furthermore, a strain sensor 58 is embedded approximately in the centre between the measuring tube side and an outer side. This may be, for example, a strain gauge or a strain gauge arrangement in a bridge circuit comprising metal-based or semiconductor-based strain gauges. With the strain sensor 58, the mechanical state of stress in the wound body is determined. A number of strain sensors may also be embedded, distributed at a number of points in the cast body 19. From the information obtained in this way, the multiaxial state of stress of the measuring tube can be calculated, and in this way the permissible loading in the respective installation situation can be monitored.

FIG. 13 shows a longitudinal section of an embodiment of an MID according to the invention in which the measuring tube with the subsystems embedded in it for signal pickup and magnetic field generation are embedded in transparent fibre composite material.

Components of fibre composite material built up layer by layer can be made transparent if, after winding with layers that are preimpregnated with resin, the curing takes place in a high vacuum. This is so because the glass fibres in the case of GRP materials are transparent; the non-transparency of fibre composite materials is caused by the presence of many small pockets of air trapped in the resin. These are removed in the vacuum treatment, with the result that the fibre composite material becomes transparent in this way.

In the case of a measuring tube of transparent fibre composite material, sensors which are based on optical operating principles can additionally be embedded. In the MID represented in FIG. 13, an optical measuring chain, comprising a light source 53 and an optical receiver 52 lying opposite the latter, is embedded in the layers of fibre composite material on the right, to be precise in such a way that the optical windows of the light source 53 and the receiver 52 are separated from the substance being measured only by a thin layer of transparent fibre composite material, for reasons of protection from contamination.

In this way, a series of optical measuring methods can be realized and consequently additional further information concerning other measured variables can be obtained from the substance being measured.

For example, the light source 53 may be a laser diode tuned to a specific wavelength. By measuring the light intensity arriving at the receiver in relation to the light intensity emitted by the laser diode, the light absorption in the substance being measured at the specific wavelength can be determined, and from this conclusions as to the composition of the substance being measured can be obtained. In this way a small absorption spectrometer can in principle be embedded in the measuring tube of transparent fibre composite material. If the light source 53 emits a wide spectrum, it is possible to obtain information on the turbidity of the substance being measured from the ratio of the total intensity registered at the receiver 52 in relation to the light intensity transmitted. This is very advantageous for example when using the measuring device for process monitoring in breweries.

On the left side of the measuring tube 2 in FIG. 13, the optical sensors are attached to the measuring tube on the outside by means of mounting elements 60*a,b,c,d*. This is advantageous whenever very sensitive optical components are used, for example those which are damaged by increased temperatures possibly occurring during the curing of the resin.

Optical image recording chips, for instance the CCD chips used in digital cameras, also come into consideration for example as optical sensor components. With such image recording subassemblies and image processing software stored in the transmitter 8, in a microprocessor with a memory, automatic optical monitoring of the substance being measured can be carried out. For example, flowing transparent foods such as juices could be monitored for the presence of undesired foreign bodies at the same time as the flow measurement.

The exemplary embodiments described above do not constitute all possible embodiments of MIDs according to the invention. All further embodiments that are not mentioned here but arise as a result of combinations of the embodiments described here or parts thereof are therefore intended to be covered by the present invention. In particular, in the case of the construction of the magnetic system it is also possible to proceed in such a way—unlike that described in FIGS. 1 to 4—that the exciting coils are first fixed on the wound body and then the ferromagnetic core is fixed on them.

The invention claimed is:

1. A magnetic-inductive measuring device for measuring the through flow of electrically conductive flowing substances, comprising:
a measuring tube that carries the flowing substances:
a signal pickup connected to the measuring tube, wherein the signal pickup measures signals generated by the flowing substances;
a magnetic system connected to the measuring tube, wherein the magnetic system generates a magnetic field that is applied to the flowing substances, and
a housing that bounds the measuring tube on an ambient side,
wherein at least one of the measuring tube, the signal pickup, and the magnetic system is entirely or partly formed by layers of fibre composite material and/or is embedded in layers of fibre composite material,
wherein at least one shielding layer against electrical or magnetic or electromagnetic fields is embedded in the layers of fibre composite material between the signal pickup and the housing on the ambient side.

2. The measuring device according to claim 1, wherein the shielding layer is formed from conductive fibre composite material or from metal foil or from metal mesh.

3. The measuring device according to claim 1, wherein an electrical connection device is attached to the housing such that electrical connecting conductors are formed from at least one of the signal pickup and the measuring transducer including the coils to the electrical connection device.

4. The measuring device according to claim 3, wherein the electrical connection device comprises a measuring transducer.

5. A magnetic-inductive measuring device for measuring the through flow of electrically conductive flowing substances, comprising:
a measuring tube that carries the flowing substances:
a signal pickup connected to the measuring tube, wherein the signal pickup measures signals generated by the flowing substances;
a magnetic system connected to the measuring tube, wherein the magnetic system generates a magnetic field that is applied to the flowing substances;
a housing that bounds the measuring tube on an ambient side; and
an additional pickup for recording at least one further measured variable of at least one of the substance and the measuring tube,
wherein at least one of the measuring tube, the signal pickup, and the magnetic system is entirely or partly formed by layers of fibre composite material and/or is embedded in layers of fibre composite material.

6. The measuring device according to claim 5, wherein the information obtained from a measuring signal of the at least one further measuring pickup is used to carry out a device diagnosis, in particular the device diagnosis includes at least one of monitoring the operational limit and determining the remaining service life.

7. A magnetic-inductive measuring device for measuring the through flow of electrically conductive flowing substances comprising:
a measuring tube that carries the flowing substances;
a signal pickup connected to the measuring tube, wherein the signal pickup measures signals generated by the flowing substances;
a magnetic system connected to the measuring tube, wherein the magnetic system generates a magnetic field that is applied to the flowing substances;
a housing that bounds the measuring tube on an ambient side; and
a first measuring pickup for recording a measured variable of the flowing substance and a second further measuring pickup for recording a measured variable of the measuring tube,
wherein at least one of the measuring tube, the signal pickup, and the magnetic system is entirely or partly formed by layers of fibre composite material and/or is embedded in layers of fibre composite material.

8. The measuring device according to claim 7, wherein at least one of the first and second measuring pickup is a temperature sensor.

9. The measuring device according to claim 8, wherein the first measuring pickup is one of a pressure sensor, or an optical turbidity sensor, an optical analyzer, or an imaging optoelectronic component.

10. The measuring device according to claim 8, wherein the second measuring pickup is a strain gauge.

11. A magnetic-inductive measuring device for measuring the through flow of electrically conductive flowing substances, comprising:

- a measuring tube that carries the flowing substances;
- a signal pickup connected to the measuring tube, wherein the signal pickup measures signals generated by the flowing substances;
- a magnetic system connected to the measuring tube, wherein the magnetic system generates a magnetic field that is applied to the flowing substances;
- a housing that bounds the measuring tube on an ambient side; and
- a bounding surface on a substance side of the device, wherein the bounding surface is nanostructured and formed with reduced adhesiveness,
- wherein at least one of the measuring tube, the signal pickup, and the magnetic system is entirely or partly formed by avers of fibre composite material and/or is embedded in layers of fibre composite material.

12. The measuring device according to claim 11, wherein the bounding surface on the substance side is structured in the manner of a lotus leaf surface.

13. A magnetic-inductive measuring device for measuring the through flow of electrically conductive flowing substances, comprising:

- a measuring tube that carries the flowing substances;
- a signal pickup connected to the measuring tube, wherein the signal pickup measures signals generated by the flowing substances;
- a magnetic system connected to the measuring tube, wherein the magnetic system generates a magnetic field that is applied to the flowing substances; and
- a housing that bounds the measuring tube on an ambient side,
- wherein at least one of the measuring tube, the signal pickup, and the magnetic system is entirely or partly formed by layers of fibre composite material and/or is embedded in layers of fibre composite material, and
- wherein the layers of fibre composite material are produced by a winding technique.

* * * * *